(12) United States Patent
Seki et al.

(10) Patent No.: US 12,551,835 B2
(45) Date of Patent: Feb. 17, 2026

(54) FILTER PACK AND AIR FILTER PROVIDED WITH SAME

(71) Applicant: NIPPON MUKI CO., LTD., Tokyo (JP)

(72) Inventors: Kazuya Seki, Tochigi (JP); Shiro Hayashi, Ibaraki (JP); Hitoshi Niinuma, Ibaraki (JP)

(73) Assignee: NIPPON MUKI CO., LTD., Tokyo (JP)

( * ) Notice: Subject to any disclaimer, the term of this patent is extended or adjusted under 35 U.S.C. 154(b) by 435 days.

(21) Appl. No.: 18/015,174

(22) PCT Filed: Jul. 8, 2021

(86) PCT No.: PCT/JP2021/025821
§ 371 (c)(1),
(2) Date: Jan. 9, 2023

(87) PCT Pub. No.: WO2022/014466
PCT Pub. Date: Jan. 20, 2022

(65) Prior Publication Data
US 2023/0249117 A1    Aug. 10, 2023

(30) Foreign Application Priority Data
Jul. 16, 2020    (JP) .................... 2020-122391

(51) Int. Cl.
*B01D 46/52* (2006.01)
*B01D 46/00* (2022.01)

(52) U.S. Cl.
CPC ....... *B01D 46/523* (2013.01); *B01D 46/0002* (2013.01)

(58) Field of Classification Search
CPC .................................................. B01D 46/523
See application file for complete search history.

(56) References Cited

U.S. PATENT DOCUMENTS 8,597,393 B2    12/2013    Morita et al.
2011/0314782 A1    12/2011    Morita et al.
(Continued)

FOREIGN PATENT DOCUMENTS

DE    40 38 966    6/1992
JP    2000-107539    4/2000
(Continued)

OTHER PUBLICATIONS

Supplementary European Search Report issued in European Patent Application No. 21842059.4, dated Apr. 24, 2024.
(Continued)

*Primary Examiner* — Robert Clemente
(74) *Attorney, Agent, or Firm* — GREENBLUM & BERNSTEIN, P.L.C.

(57) ABSTRACT

Provided are a filter pack capable of suitably maintaining a space between pleats while suppressing an increase in pressure loss, and an air filter provided with the same.
The filter pack includes a filter medium that collects fine particles in a gas and has multiple pairs of ventilation surfaces which are continuous and face each other through alternating folds due to pleating, and a space holding member that holds a space between each of the pairs of ventilation surfaces, and that is formed extending in a direction orthogonal to the fold on at least one of the pair of ventilation surfaces and has a base material layer and at least one space forming layer formed on the base material layer.

7 Claims, 7 Drawing Sheets

(56) References Cited

U.S. PATENT DOCUMENTS

2019/0336903 A1 11/2019 Hyoudou et al.
2021/0387128 A1 12/2021 Izumiya et al.

FOREIGN PATENT DOCUMENTS

| JP | 2003-284914 | 10/2003 |
| JP | 2004-321937 | 11/2004 |
| JP | 2010-149055 | 7/2010 |
| JP | 2011-125832 | 6/2011 |
| JP | 2014-113532 | 6/2014 |
| JP | 2020-062610 | 4/2020 |
| TW | 503773 | 9/2002 |
| TW | 202015780 | 5/2020 |
| WO | 2020/079882 | 4/2020 |

OTHER PUBLICATIONS

International Search Report issued in International Patent Application No. PCT/JP2021/025821, dated Sep. 14, 2021.

FILTER PACK AND AIR FILTER PROVIDED WITH SAME

TECHNICAL FIELD

The present invention relates to a filter pack including a pleated filter medium, and an air filter provided with the same.

BACKGROUND ART

Conventionally, a filter pack in which a space holding member is formed in a pleated filter medium so as to keep a space between pleats uniform is known. For example, PTL 1 discloses a filter pack in which a space holding member is formed by transferring a hot melt adhesive applied to a jig to a filter medium.

CITATION LIST

Patent Literature

PTL 1: JP2020-062610A

SUMMARY OF INVENTION

Technical Problem

When the space holding member is formed on the filter medium by transfer, there is an advantage that it is easy to control the height and the outer shape required as the space holding member.

Here, the hot melt adhesive such as a thermoplastic resin is required to soften for enhancing the adhesiveness to the filter medium. However, in the case of forming it on the filter medium by transfer, when a hot melt resin is softened for obtaining adhesiveness, a lower portion of the space holding member may expand laterally after transfer, and a desired shape may not be obtained.

The invention has been made in consideration of such circumstances, and an object of the invention is to provide a filter pack capable of suitably maintaining a space between pleats while suppressing an increase in pressure loss, and an air filter provided with the same.

Solution to Problem

In order to achieve the above-mentioned object, the filter pack according to the invention includes a filter medium that collects fine particles in a gas and has multiple pairs of ventilation surfaces which are continuous and face each other through alternating folds due to pleating, and a space holding member that holds a space between each of the pairs of ventilation surfaces, and that is formed extending in a direction orthogonal to the fold on at least one of the pair of ventilation surfaces and has a base material layer and at least one space forming layer formed on the base material layer.

Further, the air filter according to the invention includes the filter pack, and a frame body surrounding the filter pack so that the folds of the filter medium of the filter pack are arranged on an upstream side and a downstream side in the direction of airflow through the filter medium.

Advantageous Effects of Invention

In the filter pack and the air filter provided with the same according to the invention, a space between pleats can be suitably maintained while suppressing an increase in pressure loss.

DESCRIPTION OF EMBODIMENTS

Embodiments of the filter pack and the air filter according to the invention will be described with reference to the attached drawings.

Figure 1:
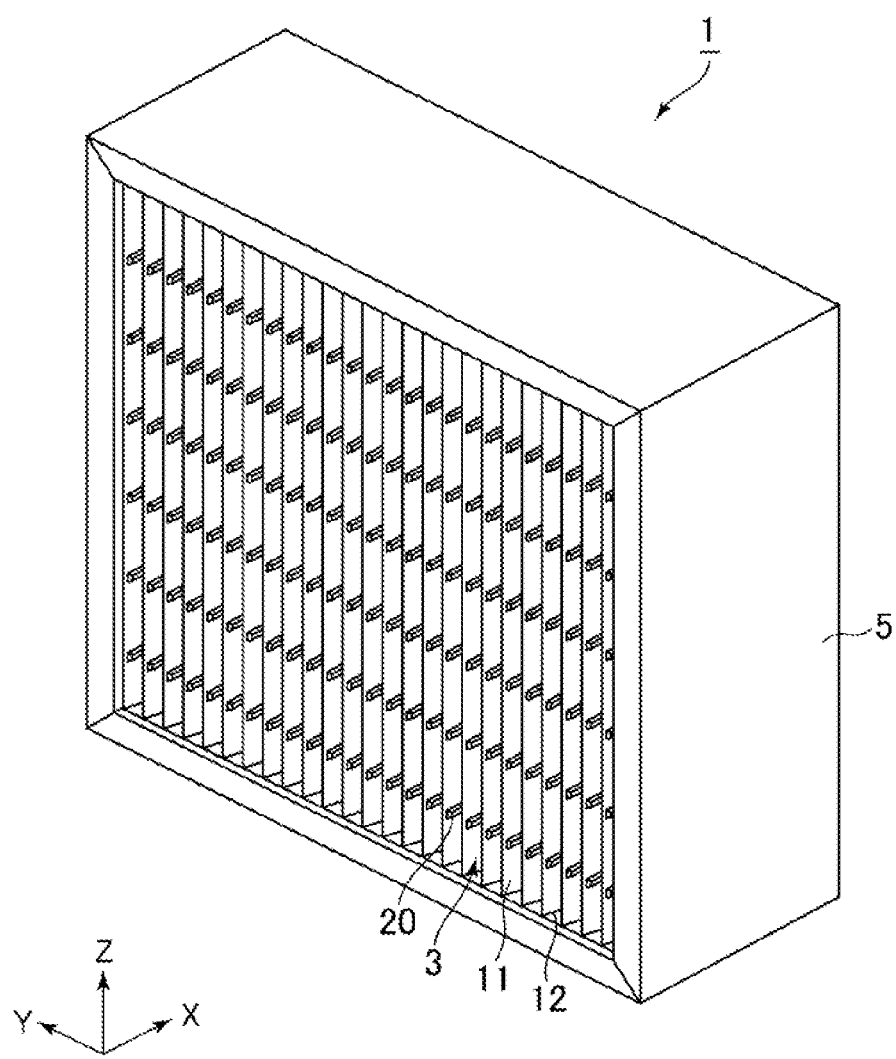
FIG. 1 is an external perspective view showing an air filter according to an example of the present embodiment.

FIG. 1 is an external perspective view showing an air filter 1 according to an example of the present embodiment.

Figure 2:
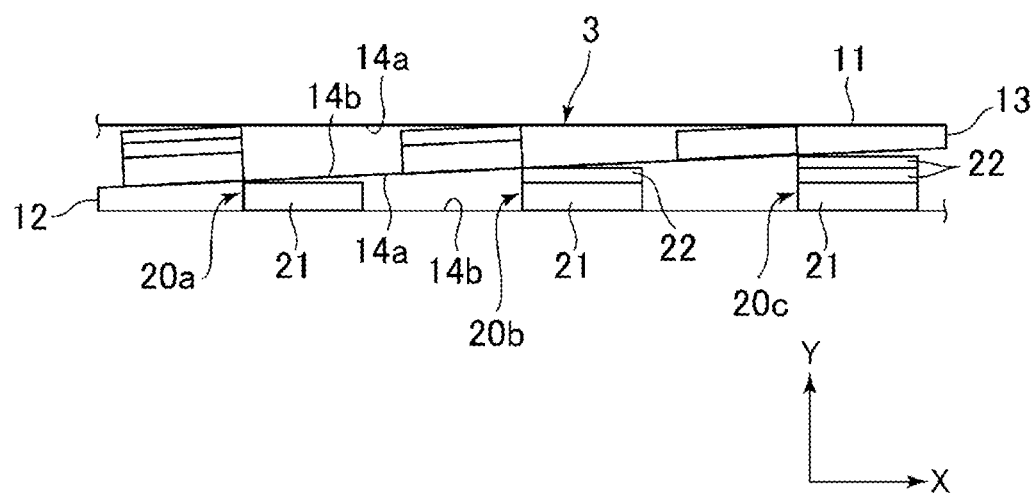
FIG. 2 is a diagram showing a part of a folded filter pack seen in a direction in which folds of pleats extend.

FIG. 2 is a diagram showing a part of a folded filter pack 3 seen in a direction in which folds of pleats extend.

Figure 3:
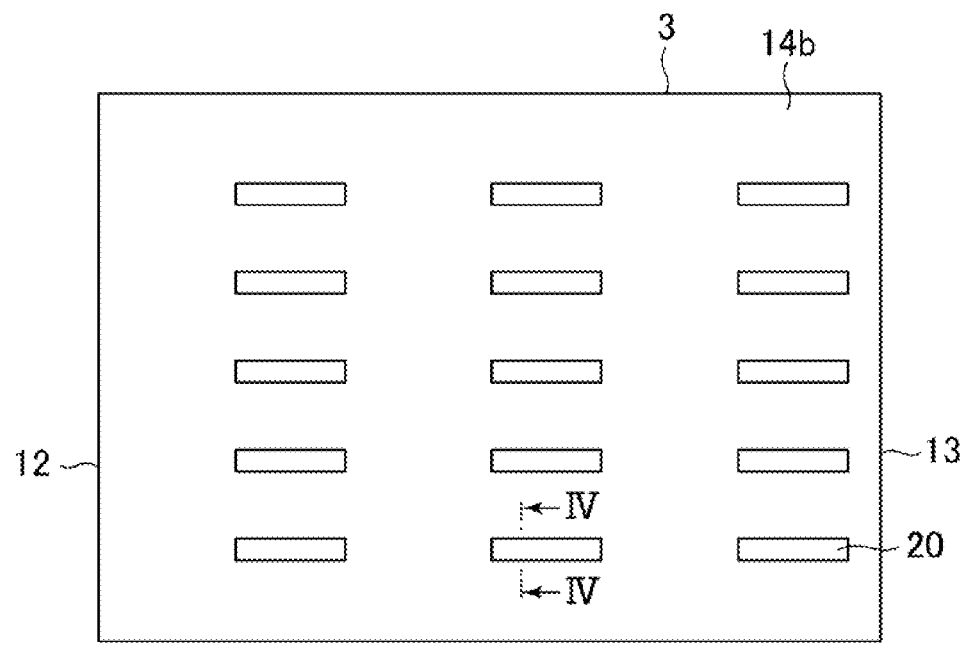
FIG. 3 is a diagram showing a ventilation surface on which a space holding member is formed.

FIG. 3 is a diagram showing a ventilation surface 14b on which a space holding member 20 is formed.

Figure 4:
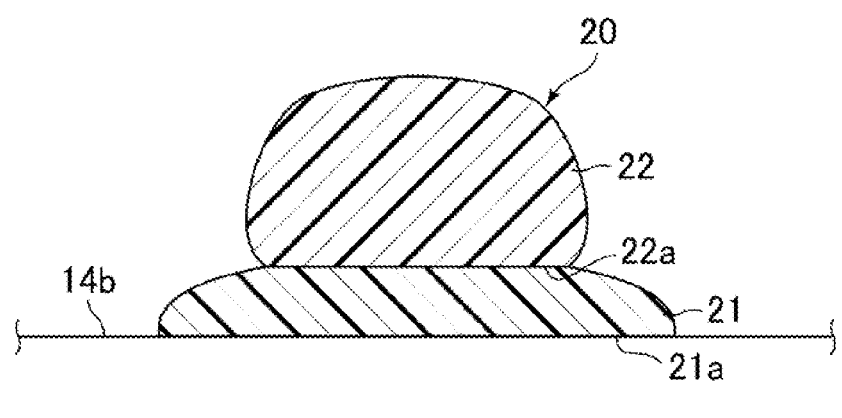
FIG. 4 is a cross-sectional view taken along the line IV-IV of FIG. 3.
Figure 4:
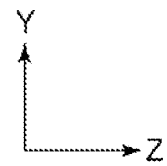

FIG. 4 is a cross-sectional view taken along the line IV-IV of FIG. 3.

The air filter 1 includes the filter pack 3 and a frame body 5. The frame body 5 surrounds the filter pack 3 so that the folds of a filter medium 11 of the filter pack 3 are arranged on an upstream side and a downstream side in the direction of airflow through the filter medium 11 (X direction). The filter pack 3 has the filter medium 11 and multiple space holding members 20.

The filter medium 11 is a member that collects fine particles in a gas. The filter medium 11 is used, for example, for removing dust having a particle diameter of 2.5 μm or less and a concentration of 0.3 mg/m³ or less, and a filter medium having a collection efficiency of 80% or more as measured by a counting method, a pressure loss of 79 to 493 Pa, and a dust holding capacity of 200 to 800 g/m² is used. In the counting method, measurement is performed by ventilating air containing particles, having a particle diameter of 0.3 μm, of any of atmospheric dust, polyalphaolefin (PAO), and silica. The dust holding capacity is the amount of dust collected by the filter until reaching a predetermined final pressure loss. Further, the filter medium 11 may be, for example, a filter medium for a HEPA filter, a filter medium for an ULPA filter, or a filter medium for a gas removal filter.

The filter medium 11 is, for example, a fiber body made of a glass fiber, an organic fiber, or a mixed fiber of these fibers, and is, for example, a non-woven fabric or a felt. The filter medium 11 made of a glass fiber is produced, for example, by paper making using a wet method or a dry method. The filter medium 11 made of an organic fiber is produced, for example, by a spunbond method, a melt blow method, a thermal bond method, a chemical bond method, or the like. Further, the filter medium 11 may be, for example, a material obtained by stacking multiple non-woven fabrics having different collection efficiencies.

The filter medium 11 is pleated into a substantially V shape so that a mountain fold and a valley fold alternate with each other. The pleating is performed using a reciprocating type or rotary type folding machine or the like. The filter medium 11 is pleated and therefore has a mountain fold portion 12 formed of a fold and a valley fold portion 13 formed of a fold, which are parallel to each other. Further, the filter medium 11 has multiple pairs of ventilation surfaces 14a and 14b that are continuous and face each other through the mountain fold portion 12 or the valley fold portion 13. In the present embodiment, for convenience, the fold located on the upstream side of the airflow (−X direction) is referred to as the mountain fold portion 12, and the fold located in the downstream direction of the airflow (+X direction) is referred to as the valley fold portion 13.

The space holding member 20 is a member that holds a space (pleated space) between the pair of ventilation surfaces 14a and 14b of the filter medium 11. The space holding member 20 is intermittently formed on the ventilation surface 14b which is one of the pair of ventilation surfaces 14a and 14b in a direction orthogonal to the fold (substantially X direction). In FIGS. 2 and 3, it is formed in three places.

The space holding member 20 (20a, 20b, 20c) has a base material layer 21 and a space forming layer 22. The base material layer 21 is a layer directly formed on the ventilation surface 14b and functions as a base material (base) of the space holding member 20 extending in the height direction. The space forming layer 22 is a layer formed by being stacked on the base material layer 21, and its thickness (the length substantially in the Y direction) is set according to the required height of the space holding member 20. Further, as shown in FIG. 4, the space forming layer 22 is formed so that the width in a direction parallel to the direction of the fold of a contact surface 22a with the base material layer 21 (the length in the Z direction) is equal to or less than the width of the base material layer 21 in a direction parallel to the direction of the fold of a contact surface 21a with the filter medium 11.

The space holding member 20 has a portion in which only the base material layer 21 is formed and a portion in which the base material layer 21 and the space forming layer 22 are formed depending on the space between pleats. Further, the space holding member 20 has multiple space forming layers 22 according to the space between pleats. In FIG. 2, the space holding member 20a formed at a position where the space between pleats is the smallest (a tapered portion of the V shape of the filter medium 11) has only the base material layer 21. The space holding member 20b adjacent to the space holding member 20a has one space forming layer 22 on the base material layer 21. Further, the space holding member 20c which is adjacent to the space holding member 20b and is formed at a position where the space between pleats is the largest (an opening portion of the V shape) has two space forming layers 22 on the base material layer 21.

The space holding member 20 is made of, for example, a thermoplastic resin called a hot melt adhesive. As such a thermoplastic resin, for example, a polyamide-based, urethane-based, or olefin-based thermoplastic resin is exemplified. The space holding member 20 is formed by, for example, using a gun filled with a softened hot melt adhesive and directly applying the hot melt adhesive to the filter medium 11 in a direction orthogonal to the fold of the filter medium 11.

Here, the base material layer 21 is required to have fluidity (softness) at the time of adhesion from the viewpoint of adhesiveness to the ventilation surface 14b (filter medium 11). However, due to the fluidity, after being applied to the ventilation surface 14b, it drips down and spreads on the filter medium 11, and the width (the length in the Z direction) of the contact surface 21a becomes large. Further, when a required height of the space holding member 20 is tried to be obtained with the base material layer 21, it results in an increase in the application amount of the hot melt adhesive, but as described above, the width of the contact surface 21a also increases at the same time. This reduces the effective area of the filter medium 11, which may lead to a decrease in collection efficiency and an increase in pressure loss.

Therefore, in the present embodiment, the base material layer 21 is made responsible for the adhesiveness of the space holding member 20 to the ventilation surface 14b and the space forming layer 22 is made responsible for the function of forming a required height as the space holding function of the space holding member 20. Thereby, the base material layer 21 can be formed by applying a hot melt adhesive in an amount such that the effective area of the filter medium 11 is not reduced and required adhesiveness to the filter medium 11 is obtained. Further, since the space forming layer 22 is made of a material of the same type as the base material layer 21, it has better adhesiveness than the filter medium 11 and is not required to have softness as compared with the base material layer 21. Therefore, the space forming layer 22 has good moldability without dripping on the filter medium 11 side after application, and it is easy to apply a desired amount. As a result, the space forming layer 22 can be controlled to a desired height.

Such a filter pack 3 and an air filter 1 can suitably maintain the space between pleats while suppressing an increase in pressure loss. That is, since the space holding member 20 is configured to have a multi-stage structure of the base material layer 21 and the space forming layer 22, the space holding member 20 does not reduce the effective area of the filter medium 11 as compared with the case where it is configured to have a one-stage structure. Further, since the space holding member 20 is formed intermittently in a direction orthogonal to the fold, the area covering the filter medium 11 can be reduced. As a result, the filter pack 3 and the air filter 1 can reduce the increase in pressure loss due to the reduction of the ventilation surface 14b by the provision of the space holding member 20.

Further, in the step of applying the hot melt adhesive, the space forming layer 22 is formed so that the width in a direction parallel to the direction of the fold of the contact surface 22a with the base material layer 21 is equal to or less than the width in a direction parallel to the direction of the fold of the contact surface 21a between the base material layer 21 and the filter medium 11. Thereby, the space holding member 20 can prevent the space forming layer 22 from hanging down from the base material layer 21 and covering the ventilation surface 14b of the filter medium 11.

Although some embodiments have been described in the present disclosure, these embodiments are presented as examples and are not intended to limit the scope of the invention. These novel embodiments can be implemented in various other forms, and various omissions, replacements, and changes can be made without departing from the gist of the invention. These embodiments and modifications thereof are included in the scope and gist of the invention, and are also included in the scope of the invention described in the claims and equivalents thereof.

Figure 5:
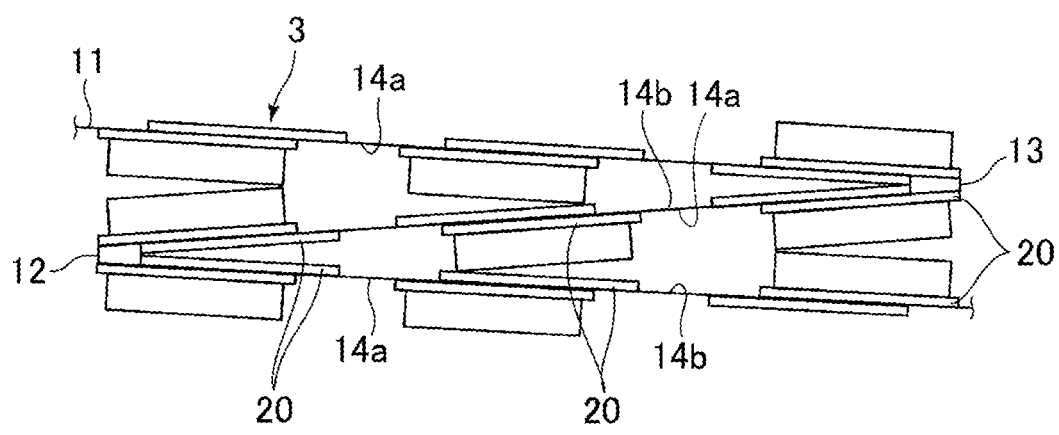
FIG. 5 is a diagram showing a filter pack as a modification corresponding to FIG. 2.

For example, as shown in FIG. 5, which shows the filter pack 3 as a modification corresponding to FIG. 2, the space holding member 20 may be arranged on both ventilation surfaces 14a and 14b of the pair of ventilation surfaces 14a and 14b facing each other so as to be in contact with at least part of the respective surfaces. By arranging the space holding member 20 on both ventilation surfaces 14a and 14b, the height of each space holding member 20 can be reduced as compared with the case where the space holding member 20 is provided only on one ventilation surface. In that case, the presence or absence of the space forming layer 22 and the number of layers may be appropriately determined according to the required space between the ventilation surfaces 14a and 14b.

Figure 6:
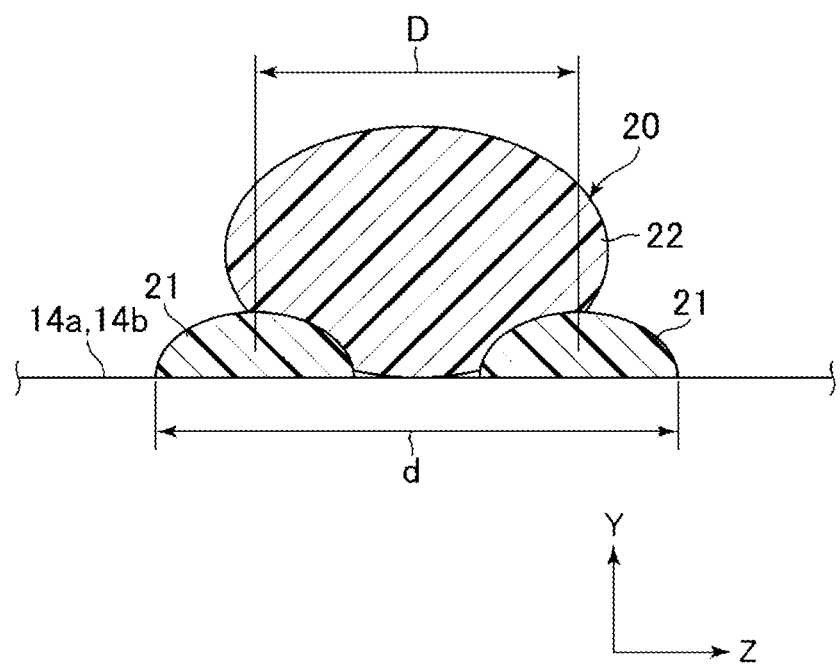
FIG. 6 is a diagram showing a space holding member as a modification corresponding to FIG. 4.

Further, as shown in FIG. 6, which shows the space holding member 20 as a modification corresponding to FIG. 4, the base material layer 21 is formed by being divided into two rows (multiple rows) in a direction orthogonal to the fold, and the space forming layer 22 may be formed so as to straddle them. At that time, the "width in a direction parallel to the direction of the fold of the contact surface between the base material layer and the filter medium" is a distance d in FIG. 6. That is, when the base material layer 21 is formed by being divided into multiple rows, it means the total length of the base material layer 21 in the width direction. Further, the "width in a direction parallel to the direction of the fold of the contact surface with the base material layer" of the space forming layer 22 is a distance D. That is, it means the total length of a portion in contact with the base material layer 21 in the width direction. At the time of formation, the space forming layer 22 is applied so as to straddle the two rows of the base material layer 21 and fit between the two rows of the base material layer 21. Therefore, the positioning of the space forming layer 22 is easy, and it is possible to avoid leakage of the hot melt adhesive for forming the space forming layer 22 from the distance d in the width direction of the base material layer 21 to reduce the effective area of the filter medium 11.

Figure 7:
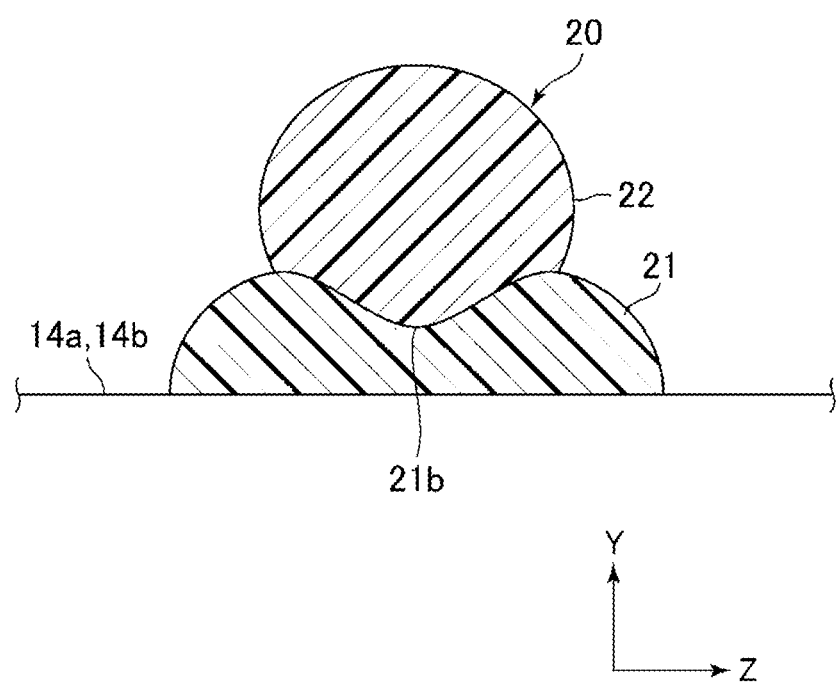
FIG. 7 is a diagram showing a space holding member as another modification corresponding to FIG. 4.

Further, it is not necessary to form the base material layer 21 with a uniform thickness, and a thermoplastic resin may be formed with a thickness in an amount required for the portion necessary for adhesiveness to the space forming layer 22. For example, as shown in FIG. 7, which shows the space holding member 20 as another modification corresponding to FIG. 4, a dent 21b for placing the space forming layer 22 may be formed by reducing the amount of the resin at the center in the width direction of the base material layer 21. As a result, as in the case of the space holding member 20 in FIG. 6, the positioning of the space forming layer 22 is facilitated, and at the same time, the adhesion area of the base material layer 21 and the space forming layer 22 can be increased, and the adhesiveness can be improved.

When the space holding member 20 is formed on the ventilation surface 14b as in the filter pack 3 shown in FIG. 2, the same thermoplastic resin as the space holding member 20 may be applied thin to the ventilation surface 14a in order to maintain the shape of the ventilation surface 14a.

The space holding member 20 may be formed of a material as formed by application onto the filter medium 11 in a softened state in place of the hot melt adhesive, for example, urethane, a rubber, a resin, a ceramic, or the like. The space holding member 20 may be continuously formed without being intermittently formed in a direction orthogonal to the fold. In the space holding member, the space forming layer may be stacked on the base material layer in all cases. That is, there may or may not be a portion made only of the base material layer 21 as in the case of the space holding member 20. Even in the length direction (substantially X direction) of the space holding member 20, it may be formed so that the length of the contact surface 22a between the space forming layer 22 and the base material layer 21 is equal to or less than the length of the contact surface 21a between the base material layer 21 and the filter medium 11.

REFERENCE SIGNS LIST

1: air filter
3: filter pack
5: frame body
11: filter medium
14a: ventilation surface
14b: ventilation surface
20, 20a, 20b, 20c: space holding member
21: base material layer
21a, 22a: contact surface
22: space forming layer

The invention claimed is:

1. A filter pack, comprising:
a filter medium that collects fine particles in a gas and has multiple pairs of ventilation surfaces which are continuous and face each other through alternating folds due to pleating;
a plurality of space holding members are intermittently formed on a single side of a fold of a ventilation surface of the multiple pairs of ventilation surfaces, the plurality of space holding members hold a space between each of the pairs of ventilation surfaces, and each space holding member of the plurality of space holding members is formed extending in a direction orthogonal to a fold of the alternating folds on at least one of the pair of ventilation surfaces and has a base material layer and at least one space forming layer formed on the base material layer.

2. The filter pack according to claim 1, wherein each space holding member is formed extending intermittently in the direction orthogonal to the fold.

3. The filter pack according to claim 1, wherein each space forming layer is formed so that a width of a first contact surface with the base material layer in a direction parallel to the direction of the fold is equal to or less than a width of a second contact surface between the base material layer and the filter medium in the direction parallel to the direction of the fold.

4. The filter pack according to claim 1, wherein the base material layer is formed by being divided into multiple rows in the direction orthogonal to the fold.

5. An air filter, comprising:
the filter pack according to claim 1; and
a frame body surrounding the filter pack so that the alternating folds of the filter medium of the filter pack are arranged on an upstream side and a downstream side in a direction of airflow through the filter medium.

6. The filter pack according to claim 1, wherein at least one space holding member of the plurality of space holding members is spaced apart from, in the direction orthogonal to the fold, a fold portion that includes the alternating folds.

7. The filter pack according to claim 1, wherein at least one of the plurality of space holding members includes at least two space forming layers formed on the base material layer.

* * * * *